(12) United States Patent
Johnson

(10) Patent No.: US 10,969,027 B2
(45) Date of Patent: Apr. 6, 2021

(54) VALVE STEM ASSEMBLIES

(71) Applicant: Todd Johnson, Berryville, VA (US)

(72) Inventor: Todd Johnson, Berryville, VA (US)

( * ) Notice: Subject to any disclaimer, the term of this patent is extended or adjusted under 35 U.S.C. 154(b) by 0 days.

(21) Appl. No.: 16/737,109

(22) Filed: Jan. 8, 2020

(65) Prior Publication Data

US 2020/0141505 A1 May 7, 2020

Related U.S. Application Data

(63) Continuation of application No. 15/572,726, filed as application No. PCT/US2016/035643 on Jun. 3, 2016, now Pat. No. 10,539,247.

(60) Provisional application No. 62/171,740, filed on Jun. 5, 2015.

(51) Int. Cl.
*F16K 15/20* (2006.01)
*B60C 29/02* (2006.01)
*B60C 29/00* (2006.01)

(52) U.S. Cl.
CPC ............ *F16K 15/20* (2013.01); *B60C 29/005* (2013.01); *B60C 29/02* (2013.01)

(58) Field of Classification Search
CPC ........ F16K 15/20; B60C 29/005; B60C 29/02
USPC ............ 137/487.5, 230, 231, 315.27, 315.01
See application file for complete search history.

(56) References Cited

U.S. PATENT DOCUMENTS

| | | | | | |
|---|---|---|---|---|---|
| 2,277,885 A | ‡ | 3/1942 | Rodanet | ................ | F16B 5/0258 152/427 |
| 2,634,785 A | ‡ | 4/1953 | Tubbs | ...................... | B60C 5/00 152/42 |
| 2,709,383 A | ‡ | 5/1955 | Davies | ..................... | B25B 27/24 29/221 |
| 2,866,492 A | ‡ | 12/1958 | Lee | .......................... | B60C 29/02 152/42 |
| 2,872,963 A | ‡ | 2/1959 | Boyer | ..................... | B60C 29/02 152/42 |
| 2,887,926 A | ‡ | 5/1959 | Bryant | .................. | F16B 37/067 24/290 |
| 2,962,073 A | ‡ | 11/1960 | Reed | ........................ | B60C 29/02 152/42 |
| 2,966,191 A | ‡ | 12/1960 | Williams | ................ | B60C 29/02 152/42 |
| 2,968,333 A | ‡ | 1/1961 | Ayres | ...................... | B60C 25/18 152/42 |
| 3,013,643 A | ‡ | 12/1961 | Perry | ..................... | F16B 5/0258 238/DIG. 1 |
| 3,258,051 A | ‡ | 6/1966 | Kilmarx | .................. | B60C 29/02 152/42 |
| 3,368,603 A | ‡ | 2/1968 | Kuzyn | .................... | B60C 29/02 152/42 |

(Continued)

OTHER PUBLICATIONS

International Search Report for PCT/US2016/035643 dated Sep. 8, 2016 (2 Pages).‡

*Primary Examiner* — Minh Q Le

(74) *Attorney, Agent, or Firm* — Fitch, Even, Tabin & Flannery, LLP

(57) ABSTRACT

A valve stem having a hollow tube and a compression sleeve mounted to the hollow tube; wherein the hollow tube and compression sleeve are partially insertable through a container wall opening from an exterior side of the container wall through to an interior side of the container wall, and a mechanism accessible from the exterior side of the container wall to compress the compression sleeve against the interior side of the container wall.

3 Claims, 9 Drawing Sheets

(56) References Cited

U.S. PATENT DOCUMENTS

| | | | | |
|---|---|---|---|---|
| 3,387,354 A ‡ | 6/1968 | Mossberg | B60C 25/18 | 29/221 |
| 3,667,340 A ‡ | 6/1972 | Black | F16B 19/008 | 411/38 |
| 3,750,258 A ‡ | 8/1973 | Sampo | B60C 25/18 | 29/221 |
| 3,750,525 A ‡ | 8/1973 | Waters | F16B 19/008 | 411/181 |
| 3,834,270 A ‡ | 9/1974 | Triplett | F16B 13/061 | 411/38 |
| 3,836,035 A ‡ | 9/1974 | Simbirdi | B65D 39/12 | 220/235 |
| 3,858,479 A ‡ | 1/1975 | Sekhon | F16B 19/1054 | 411/34 |
| 3,863,697 A ‡ | 2/1975 | Brown | B60C 29/00 | 152/42 |
| 4,016,918 A ‡ | 4/1977 | Thacker | B60C 29/00 | 152/42 |
| 4,171,119 A ‡ | 10/1979 | Lamson | B60C 29/02 | 137/223 |
| 4,411,458 A ‡ | 10/1983 | Strunk | F16L 41/088 | 285/19 |
| 4,739,813 A ‡ | 4/1988 | Pagani | B60C 29/02 | 137/223 |
| 4,765,048 A ‡ | 8/1988 | Hokanson | B25B 27/023 | 29/221 |
| 4,807,343 A ‡ | 2/1989 | Wadsworth | B25B 27/02 | 227/14 |
| D304,817 S | 11/1989 | Earley et al. | | |
| 5,051,048 A ‡ | 9/1991 | Maddox | F16B 19/1072 | 411/34 |
| 5,097,580 A ‡ | 3/1992 | Story | B25B 27/026 | 29/221 |
| 5,259,714 A ‡ | 11/1993 | Campbell | F16B 13/061 | 411/34 |
| 5,803,108 A ‡ | 9/1998 | Schuessler, Jr. | B60C 29/062 | 137/15 |
| 5,816,284 A | 10/1998 | Lin | | |
| 6,574,843 B1 ‡ | 6/2003 | Meadows | B25B 27/24 | 29/221 |
| 6,722,409 B1 | 4/2004 | Martin | | |
| 6,776,566 B2 ‡ | 8/2004 | Kobusch | F16B 5/0283 | 411/432 |
| 6,935,821 B2 ‡ | 8/2005 | Bodin | B25B 27/0007 | 411/29 |
| 7,059,815 B2 ‡ | 6/2006 | Ando | F16B 29/00 | 411/182 |
| 7,223,056 B2 ‡ | 5/2007 | Schneider | F16B 37/067 | 411/183 |
| 7,226,263 B2 ‡ | 6/2007 | Schwarzbich | F16B 5/0233 | 403/374.3 |
| 7,303,366 B2 ‡ | 12/2007 | Smith | F16B 19/1054 | 411/43 |
| D576,254 S | 9/2008 | McBroom | | |
| 8,245,747 B2 ‡ | 8/2012 | Monjuvent | B60C 23/0408 | 152/42 |
| 8,511,332 B2 ‡ | 8/2013 | Robert | B60C 23/0494 | 137/227 |
| D704,302 S | 5/2014 | Anderson | | |
| D745,638 S | 12/2015 | Hickman | | |
| 9,388,843 B2 ‡ | 7/2016 | Stojkovic | F16B 37/067 | |
| 9,759,337 B2 | 9/2017 | Cassiman et al. | | |
| 9,937,760 B2 | 4/2018 | Austin | | |
| 2003/0066176 A1 ‡ | 4/2003 | Rivers | B25B 27/24 | 29/221 |
| 2003/0213111 A1 ‡ | 11/2003 | Groves | B25B 13/48 | 29/221 |
| 2004/0016096 A1 ‡ | 1/2004 | Capoferi | B25B 27/0028 | 29/213 |
| 2011/0079337 A1 ‡ | 4/2011 | Botte | B60C 23/0408 | 152/415 |
| 2017/0241566 A1 ‡ | 8/2017 | Taki | B60C 23/0408 | |
| 2018/0038500 A1 ‡ | 2/2018 | Mori | B60C 29/02 | |

‡ imported from a related application

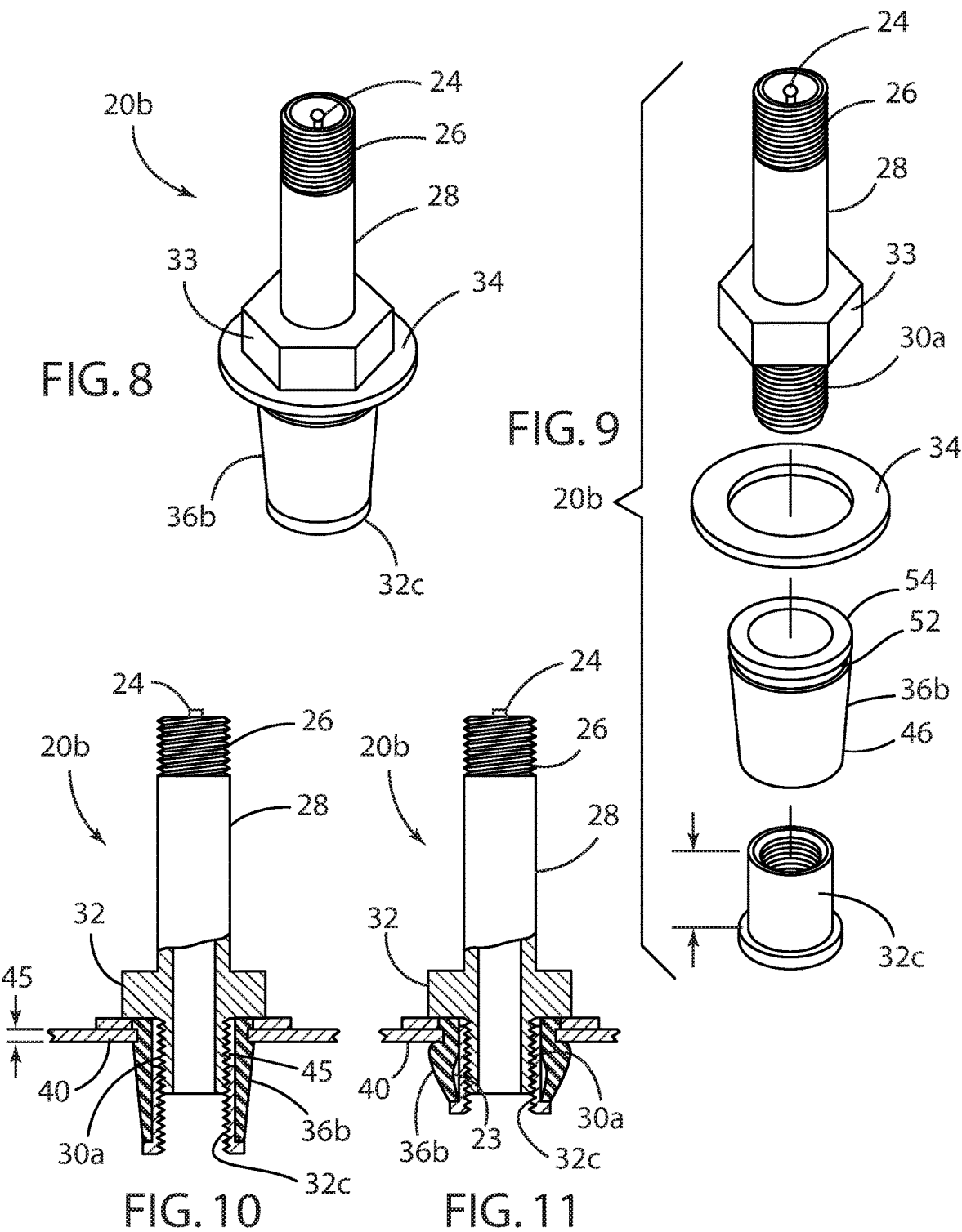

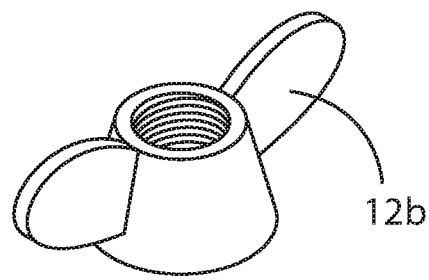
FIG. 12
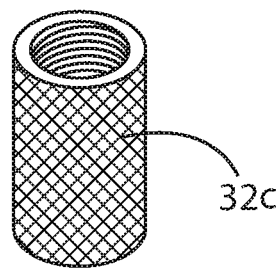
FIG. 13
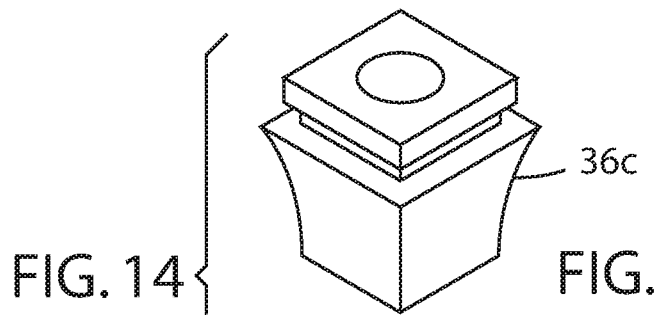
FIG. 14
FIG. 15
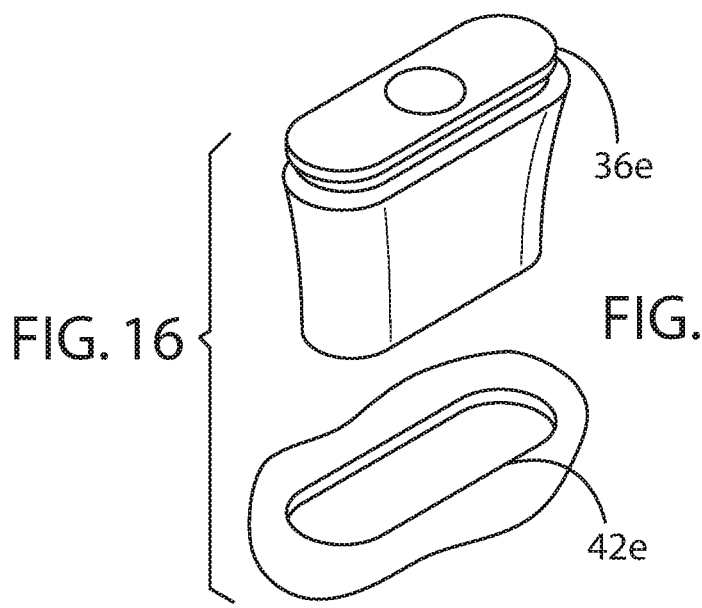
FIG. 16
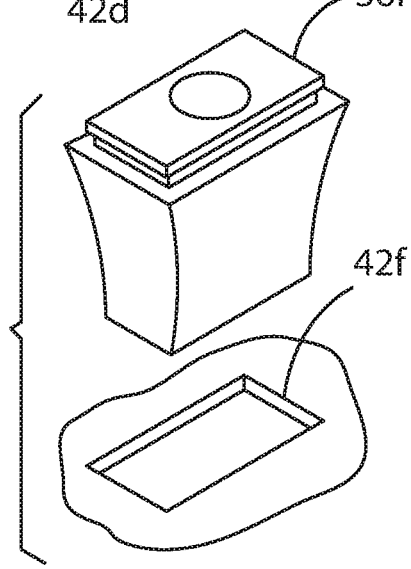
FIG. 17

VALVE STEM ASSEMBLIES

CROSS-REFERENCE TO RELATED APPLICATIONS

This application is a continuation application of U.S. application Ser. No. 15/572,726, filed Nov. 8, 2017, which is a U.S. national phase application filed under 35 U.S.C. 371 of International Application No. PCT/US2016/035643, filed Jun. 3, 2016, designating the United States, which claims priority from U.S. Provisional Patent Application No. 62/171,740, filed Jun. 5, 2015, which are hereby incorporated herein by reference in their entirety for all purposes.

FIELD

Valve stems for enclosed containers, and in particular, externally mountable valve stem assemblies that are clampable onto a wheel rim for a tubeless tire.

BACKGROUND

Valve stems are known in the art for tubeless tires. In a tubeless tire and wheel rim assembly, the tire is so constructed as to conform to the rim of a wheel to form an air-tight seal with the rim. To inflate the tire, a separate valve stem is typically seated in an airtight fashion to an opening in the rim.

A typical valve stem assembly has a hollow metal tube disposed within and bonded to a rubber sleeve. Frequently, the rubber sleeve has at its end directed to the interior of the tire an enlarged flange or base adapted to sealingly engage at least the interior surface of the wheel rim around the opening as air pressure is applied thereto. At its end directed to the exterior of the wheel rim, the metal tube projects beyond the rubber sleeve and is usually provided with external threads for retaining a valve cap and interior threads for retaining an air valve. See generally, U.S. Pat. No. 4,807,343. In this configuration, prior art valve stems generally must be installed by inserting them through the opening from the inside of the wheel rim and pulling them into position from the outside. One of the difficulties with this type of arrangement is that installing a valve stem or replacing a defective valve stem in the manner described above requires, by necessity, that the tire be removed from the rim, or at least that the tire bead be broken free from the rim to provide access to the wheel rim interior for insertion of the new stem. Tire demounting and remounting requires specialized equipment, skilled personnel, vehicle downtime and expense.

Various efforts have attempted to address this and other deficiencies in the art. Some tubeless tire valves have been developed with specific configurations that allow for exterior wheel rim mounting. See, for example, U.S. Pat. Nos. 2,634,785; 2,866,492; 2,872,963; 2,966,191; 3,258,051; 3,368,603; 3,863,697; and 4,016,918, the specifications of which are incorporated herein in their entirety. Despite these attempts, further advances are possible and desired. Such externally mountable valve stems have not proven entirely satisfactory. Specialized equipment and skilled personnel are still needed to properly externally mount a replacement valve stem. A further deficiency of these externally mountable valve stems is the frequent difficulty in obtaining a proper seal between the rubber sleeve of the valve stem assembly to the metal wheel rim.

SUMMARY

Accordingly, to advance at least the aforementioned deficiencies in the art, described herein are externally mountable valve stem assemblies that are clampable onto a container wall such as a wheel rim for a tubeless tire, and the like. The present embodiments are configured to be installed whenever and wherever desired with no specialized equipment or training. In one approach for a valve stem assembly application mountable to a wheel rim, no wheel rim modifications are needed.

According to one approach, a valve stem can have a hollow tube and a compression sleeve mounted to the hollow tube; wherein the hollow tube and compression sleeve are partially insertable through a container wall opening from an exterior side of the container wall through to an interior side of the container wall, and a mechanism accessible from the exterior side of the container wall to compress the compression sleeve against the interior side of the container wall.

In one approach the hollow tube can be metal and at least partially threaded on its exterior surface; and the compression sleeve can be made from a flexible and compressible material. The compression sleeve material can be selected from the group consisting of rubber, cork, ethylene propylene diene monomer (EPDM), Nitrile, Buna, Neoprene, Flexible Graphite, Grafoil, Aflas, Kalrez, Viton, Silicone, Metal, Mica, Felt or a plastic polymer such as Polytetrafluoroethylene (PTFE), Peek, Urethane, or Ethylene Propylene (EP), leather, combinations thereof, and the like. In applications where the compression seal could corrode rubber, silicone can be used.

In one approach, the mechanism accessible from the exterior side of the container wall to compress the compression sleeve against the interior side of the container wall may have at least one nut mounted to external threads on the hollow tube, whereby when the nut is rotated, the hollow tube is partially withdrawn from the container interior. The external threads have a stop at an interior end configured to stop the rotation of the nut when the extraction of the hollow tube reaches a predetermined position. Also, the compression sleeve may have an interior portion diameter at least $3/32"$ greater than the container wall opening. According to another approach, the compression sleeve can have an interior portion diameter having the greatest diameter to allow insertion through the container wall opening with a force of exertion easily obtainable by a person in the field. For example a force in the range of 1-100 pounds of force with a preferred range of about 10-30 pounds of force and a most preferred 20 pounds of force.

Other features will become more apparent to persons having ordinary skill in the art to which the package pertains and from the following description and claims.

BRIEF DESCRIPTION OF THE DRAWINGS

FIG. 8 illustrates a prospective view of a valve stem of the present embodiments according to another approach;

FIG. 9 illustrates an exploded perspective view of the embodiment of FIG. 8;

FIG. 10 illustrates a side cutaway view of the valve stem of FIG. 8;

FIG. 11 illustrates a side cutaway view of a valve stem of the embodiment of FIG. 8 inserted with the compression sleeve clamped onto a wheel rim;

FIG. 12 illustrates an alternate compression nut embodiment;

FIG. 13 illustrates another alternate compression nut embodiment; and

FIGS. 14-17 illustrate alternate embodiments of a compression sleeve and wheel rim receiving hole 42.

FIG. 26 illustrates an alternate embodiment of a compression sleeve and valve stem air tube.

Figure 1:
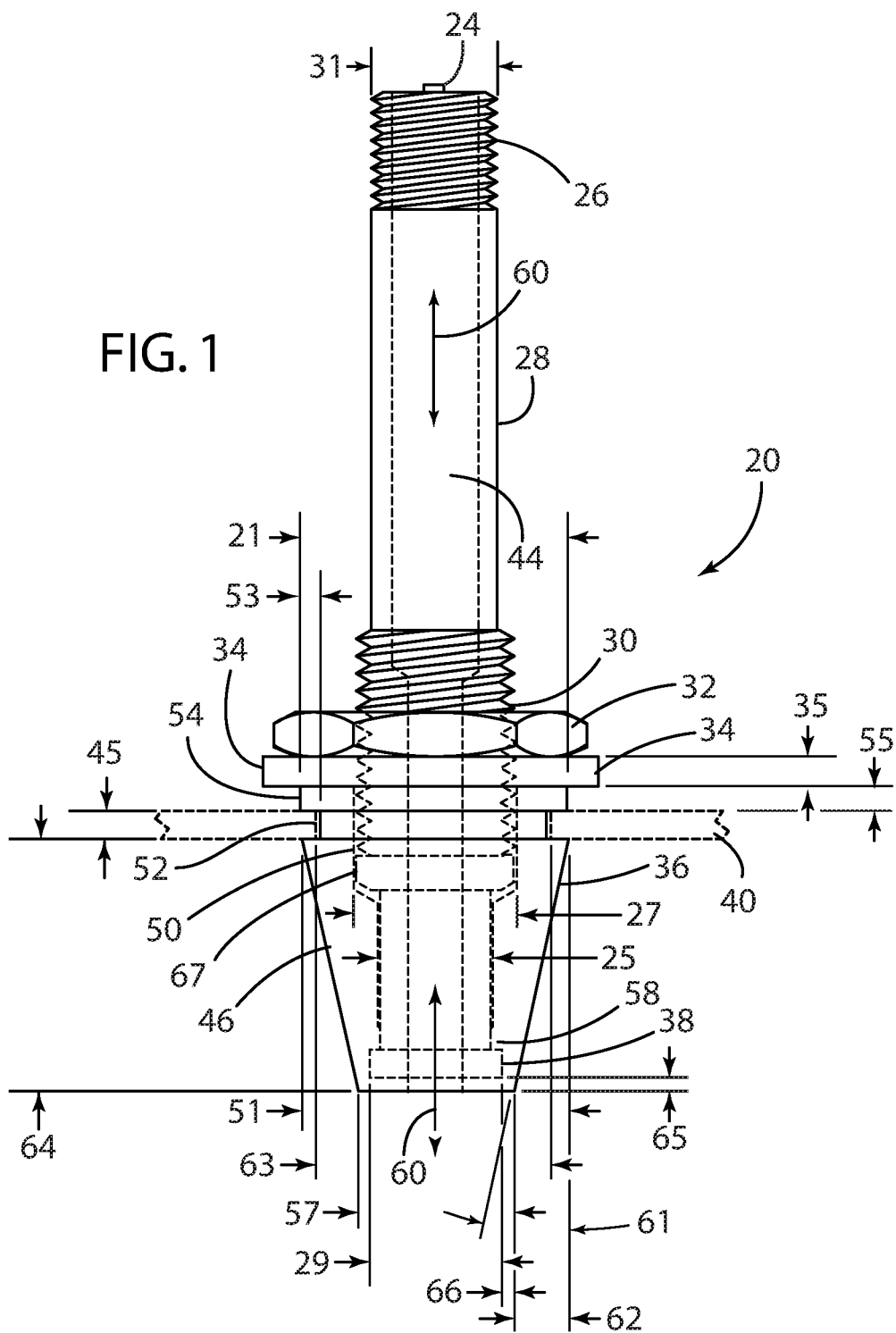
FIG. 1 illustrates a side view of a valve stem of the present embodiments according to one approach.
Figure 26:
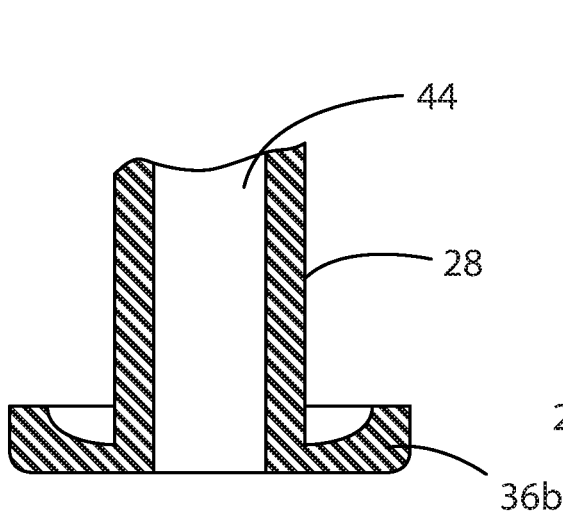
Figure 27:
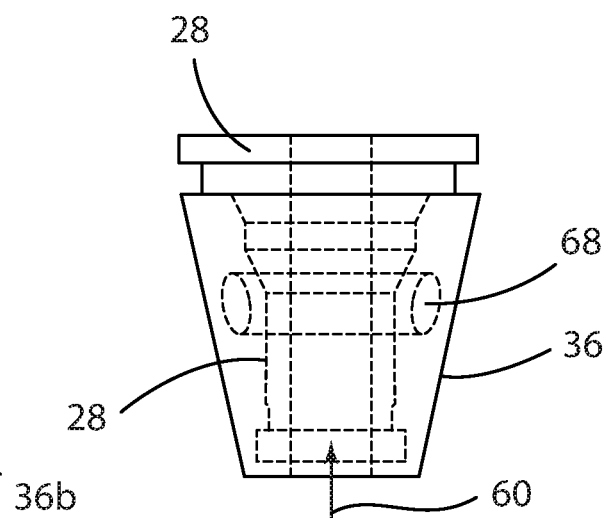
FIG. 27 illustrates a side view of a compression sleeve according to one approach.

ELEMENT LIST 20 valve stem assembly
21 diameter of rim sealer collar (54)
22 dust cap
23 void from rubber seal bulge
24 valve core
25 diameter of narrowed encapsulated valve stem in FIG. 1
26 dust cap threads
27 diameter of (30) and/or (50)
28 valve stem air tube
29 diameter of (38)
30 compression threads
31 Diameter of (28)
32 compression nut (two nuts optional)
33 fixed valve stem nut (FIG. 4)
34 compression washer
35 compression nut longitudinal length
36 compression sleeve or compression flange (rim sealer)
38 valve stem air tube flange
40 wheel rim
42 wheel rim valve stem receiving hole
43 wheel rim receiving hole dimension
44 air shaft for metal air tube
45 wheel rim thickness and notch (52) height
46 rim seal taper
48 rim sealer taper angle/dimension
50 rim sealer interior profile
51 upper taper diameter
52 rim sealer notch/detent
53 rim sealer collar outer diameter
54 rim sealer collar
55 rim seal collar thickness
57 bottom taper diameter
58 vulcanized area
60 air flow
61 rim sealer taper angle
62 delta of upper taper diameter to lower taper diameter
63 diameter dimension of notch (52)
64 FIG. 1 dimension
65 FIG. 1 dimension
66 FIG. 1 dimension
67 stop
68 donut shaped void in compression seal

DETAILED DESCRIPTION

Described herein are valve stem assemblies for enclosed containers, and in particular, externally mountable valve stem assemblies, which are clampable onto a wheel rim for a tubeless tire, and the like. The present embodiments are configured to be installed whenever and wherever desired with no specialized equipment or training or wheel rim modification. The clamp assembly allows for greater sealing properties of the valve stem than previously known in the art. The clamp assembly allows for smaller diameter of an interior rubber compression flange, which allows for easier insertion into the wheel rim valve stem opening. Thus, no special equipment is needed to force the valve stem and compression flange through the wheel rim opening. This allows for easier installation wherever the vehicle is located.

Components to clamp the valve stem to the wheel rim are externally accessible using tools known in the art, such as a wrench to a nut on the valve stem tube. As the nut is turned on a threaded portion of the valve stem tube, the tube is partially withdrawn from the interior. A compression flange is restricted from withdrawing through the opening of the wheel rim once inserted through the opening. As the tube is withdrawn, the compression flange is compressed against the interior perimeter of the wheel rim opening forming a more air tight seal. Various shapes and features of the compression flange are provided to illustrate a few of the various configurations within the scope of the embodiments.

Figure 28:
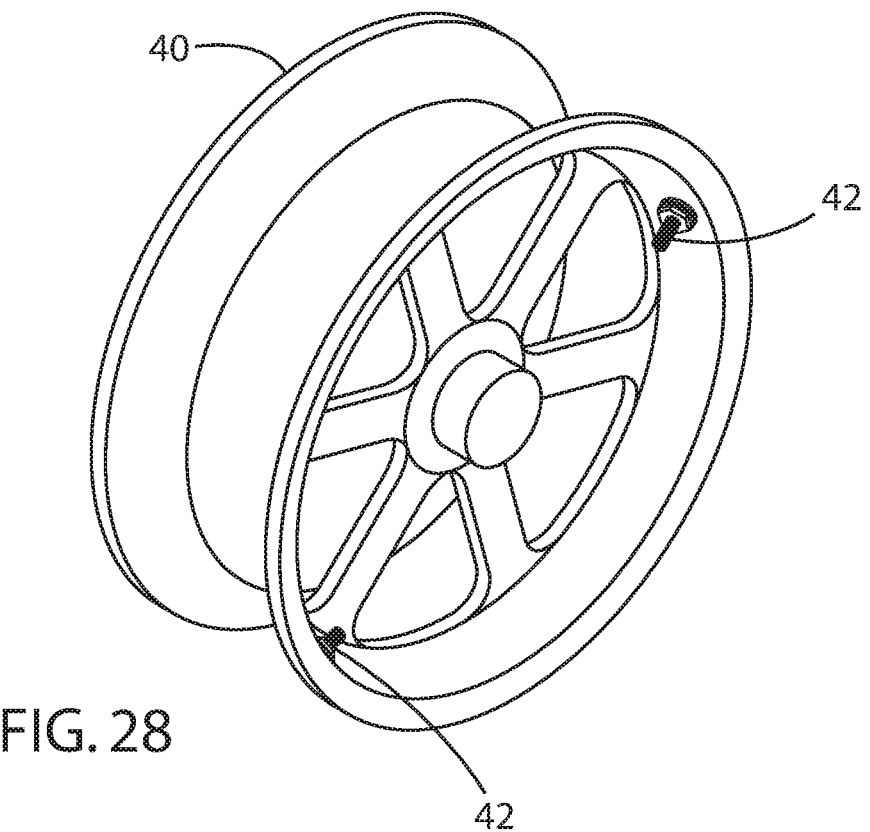
FIG. 28 illustrates a wheel rim suitable to receive the present embodiments have at least two wheel rim valve stem receiving holes.
Figure 29:
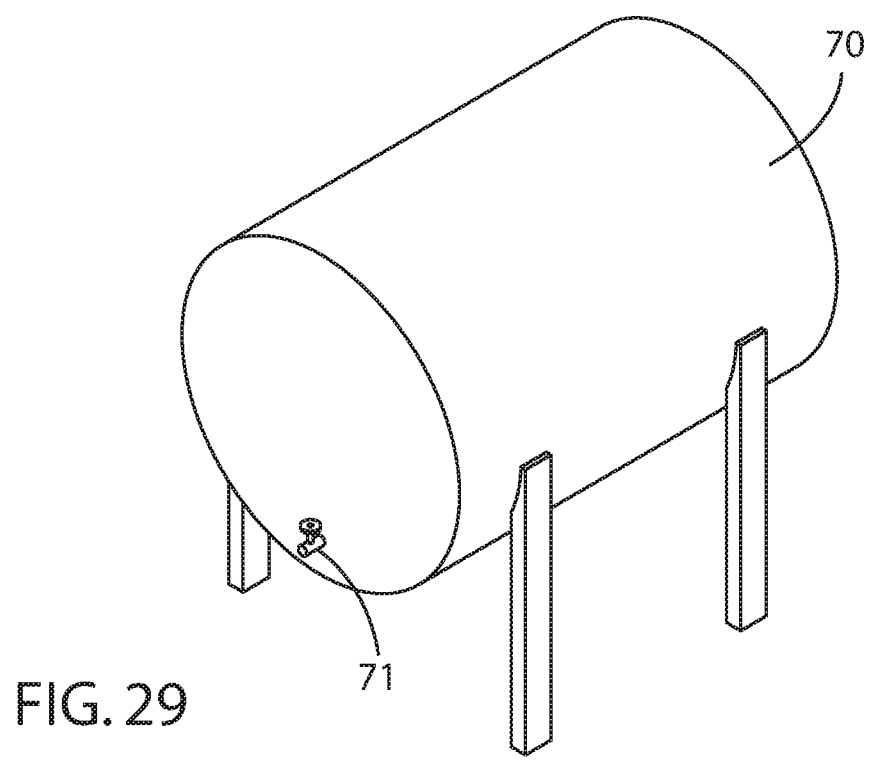
FIG. 29 illustrates a container suitable to receive the present embodiments and having a valve stem receiving hole.

The present exemplary embodiments are described as a valve stem for a tubeless tire for ease of understanding the invention. However, it is noted that the present embodiments can include any enclosed vessel configured to store and controllably dispense and receive any type of flowable substances via the valve, the valve having an interior clamp to seal a vessel opening, and the clamping device being installable through the exterior of vessel opening and adjustable via the vessel exterior. As a further illustration, shown in FIG. 28 is an adaptation of the present embodiment can be installed in a conventional oil tank. The advantages of the present embodiments in this setting are many. There are situations where there can be a desire to drain fluids out of the lower portions of such a tank, such as water or other denser contaminants. However, a user cannot access the interior of the oil tank to assist in the installation of a valve. This could now be possible, since the valve can be installed completely from the outside of the tank.

For the present embodiments the terms 'exterior' and 'interior' are used in conjunction with a description of a tubeless tire. The 'interior' is used to describe one side of the container wall that is the interior pressurized portion of a tubeless tire where the compression flange is located once installed. The 'exterior' denotes the air outside the tubeless tire on the opposite side of the container wall where the components to clamp the compression flange against the interior wall are located. It is noted though that in describing the environment of the present embodiments other terms may be used to denote the opposite sides of a container wall.

The present embodiments provide an improvement in the art in that it is unknown to provide an interior clamping mechanism to seal a wheel rim opening from the exterior of the wheel. The present embodiments are particularly useful for wheel rims on farm vehicles. Some farm equipment tires can be filled in part with water and weigh several hundred pounds. Specialized equipment is required to remove these large and heavy wheels, transport the wheel, and to demount, repair, remount, return and place back on the equipment. The present embodiments can be replaceable by a vehicle operator with no special tools or training. The advantages of such a device are evident by reduced maintenance costs and reduced vehicle down time from the quick and easy insertion of the present valve stems from the exterior of the wheel rim. In some embodiments, a wheel rim with multiple wheel rim openings may be advantageous. The valve stem assembly itself can be manufactured without significant retooling of present day valve stem manufacturing facilities.

FIGS. 1-4 show one of the present preferred embodiments generally shown as valve stem assembly 20. Please note the dimensions provided are for reference only and to aid in the understanding of the present embodiments applied to a stand valve stem for a vehicle and their relationship for one another for two types of wheel rim opening dimensions. Where only one dimension is given the dimension would be the same for both opening diameters. The representative elements shown in the figures are as follows:

21 The diameter of rim sealer collar (54) should initially be at least 1/16" larger than the diameter of the wheel rim valve stem receiving hole 42, which would then expand to about 3/32" under compression the according to one approach; 1/4" initially according to another approach; or 3/16).

Figure 2:
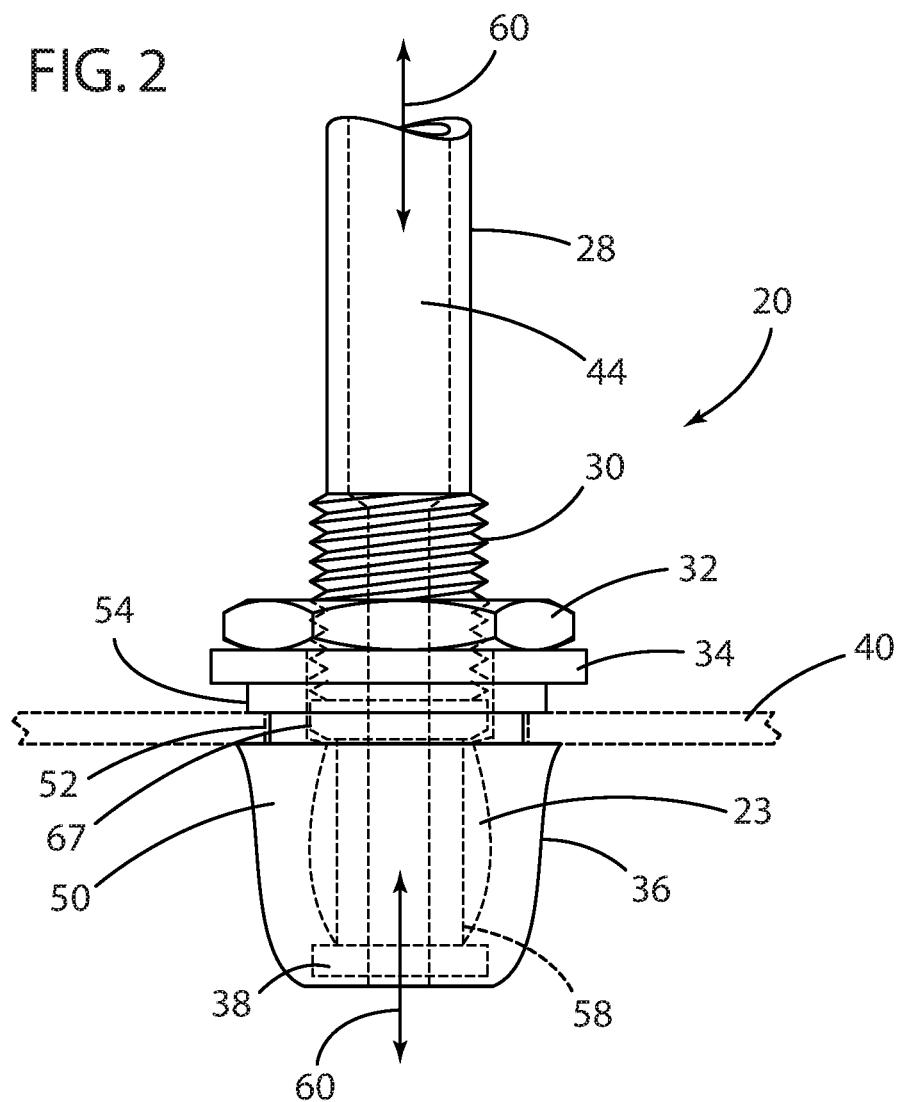
FIG. 2 illustrates a side view of a valve stem of the embodiment of FIG. 1 inserted with the compression sleeve clamped onto a wheel rim.
Figure 3:
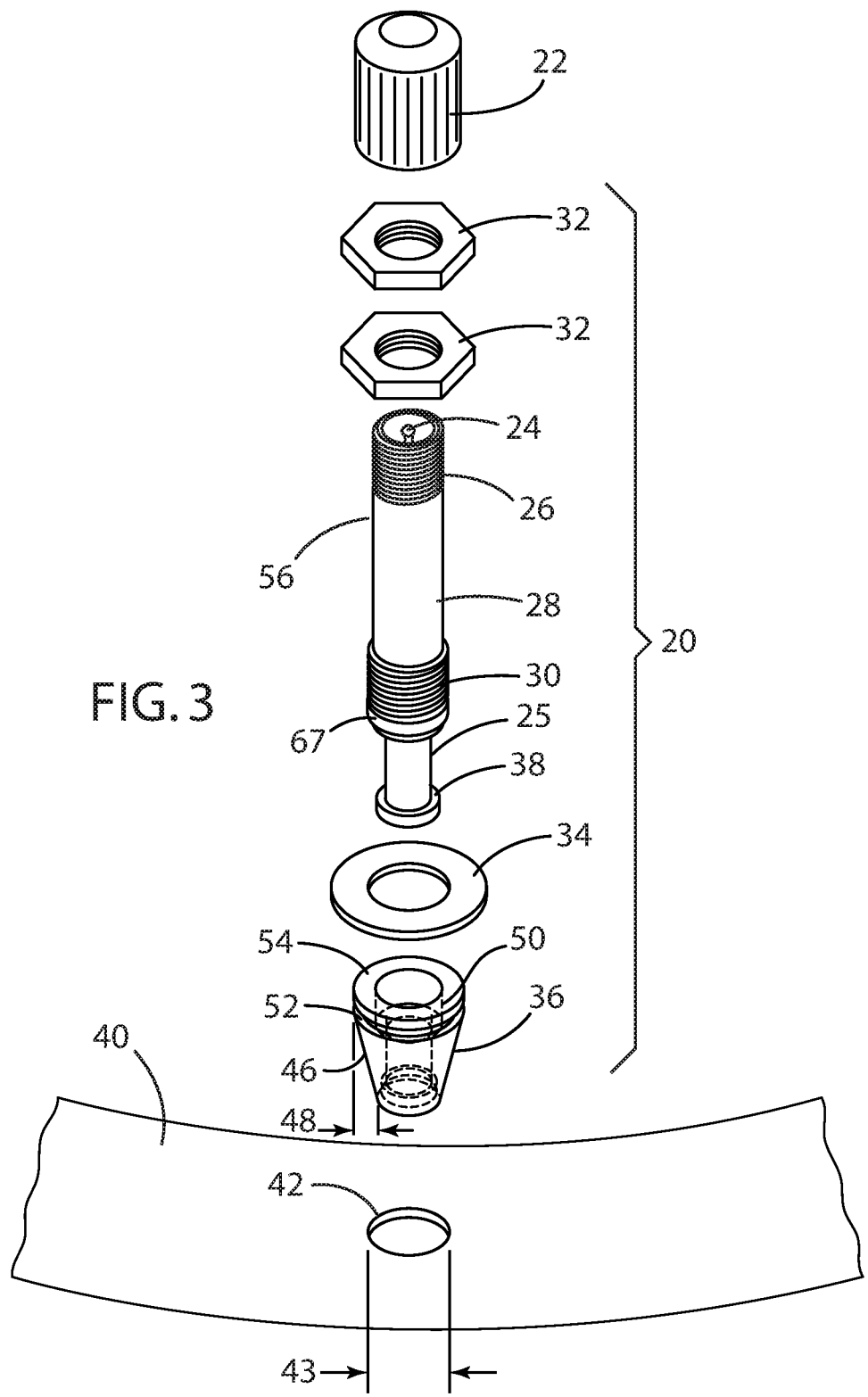
FIG. 3 illustrates an exploded perspective view of the embodiment of FIG. 1.

23 The potential void created when the compression seal is under pressure (slight or none) in its installed position (FIG. 2).

22 A standard valve stem dust cap.

23 The valve stem portion disposed within compression sleeve (FIG. 2).

24 A standard valve core typically know in the art as a Shrader valve.

25 The diameter of narrowed encapsulated valve stem portion in FIG. 1 (approx. 0.775 cm for 1.588 cm opening).

26 The dust cap threads (standard) (approx. 0.775 cm for 1.588 cm opening).

27 The diameter of compression threads (30) and/or the rim sealer interior profile (50) (approx. 1.016 cm for 1.588 cm opening). In any event, in the preferred embodiment dimension 27 is greater than dimension 31 to allow the compression nut (32) to slide down to compression threads (30).

28 The valve stem air tube (standard) (approx. 0.775 cm for 1.588 cm opening).

29 The diameter of valve stem air tube flange (38) (approx. 1.320 cm).

30 The compression threads (approx. 1.016 for 1.588 cm opening). In one embodiment, compression threads 30 are of greater diameter than the dust cap threads to allow the compression nut to slide past the dust cap threads. In an alternate embodiment, the dust cap threads can be continuous with the compression threads so that the compression nut begins at the top of the valve stem tube. In embodiments not having a thread stop (67), optional notches or other types of marks such as colored marks along thread can denote where a user should stop adjustment or retraction of valve stem air tube. Multiple notches can be used for different container wall thicknesses.

31 The diameter of valve stem air tube (28) (approx. 0.775 cm).

32 The compression nut (two nuts optional) threads match compression threads (30) (bore diameter approx. 1.016 for 1.588 cm opening).

Figure 4:
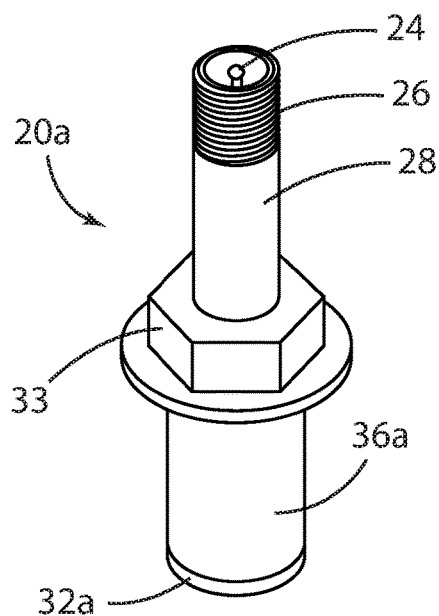
FIG. 4 illustrates a prospective view of a valve stem of the present embodiments according to another approach.
Figure 5:
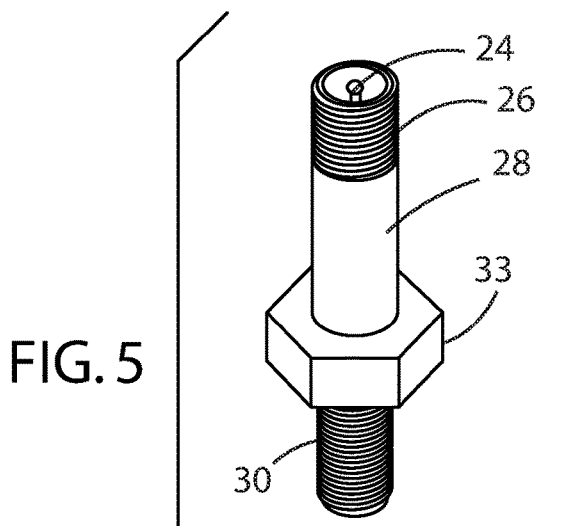
FIG. 5 illustrates an exploded perspective view of the embodiment of FIG. 4.
Figures 6, 7:
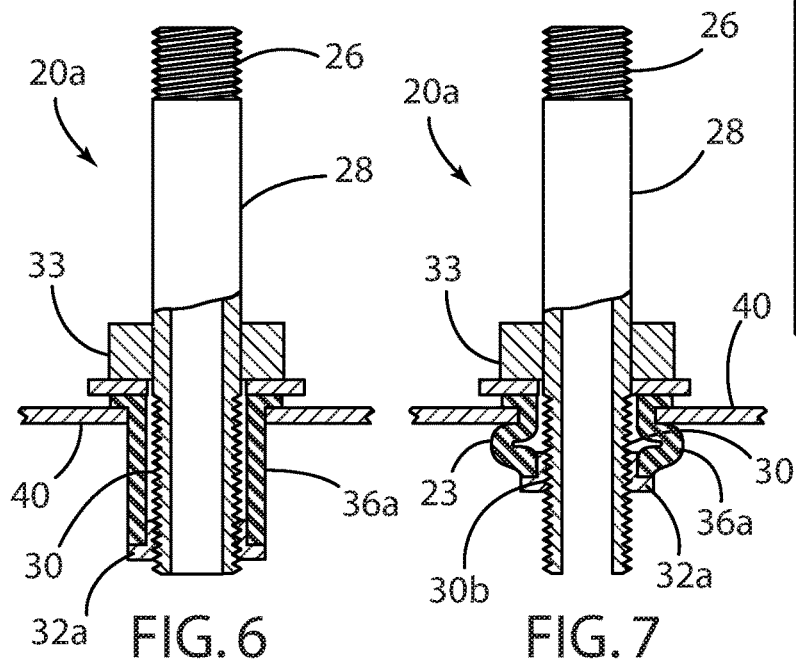
FIG. 6 illustrates a side cutaway view of the valve stem of FIG. 4.
FIG. 7 illustrates a side cutaway view of a valve stem of the embodiment of FIG. 4 inserted with the compression sleeve clamped onto a wheel rim.
Figure 18:
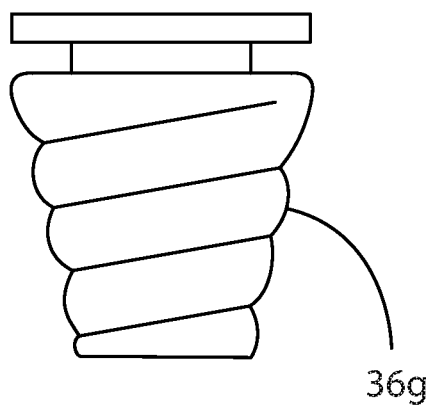
FIGS. 18-24 illustrate alternate embodiments of a compression sleeve.

33 The fixed valve stem nut (FIG. 4).

34 The compression washer (approx. inner diameter 1.97 cm for a 1.588 cm opening; approx. outer diameter 2.54 cm for 1.588 cm opening).

35 The compression nut longitudinal length (approx. 1/4" or greater).

Figure 19:
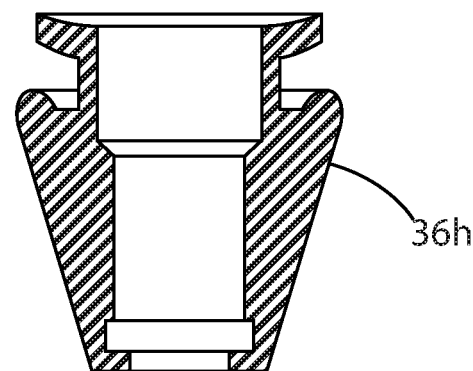

36 The compression sleeve (compression flange) (rim sealer) is made from a flexible and/or compressible and/or stretchable material. Compression sleeve 36 is one of the key elements of the present embodiments (shown, e.g., as rubber seal 36). Compression sleeve 36 is bound to valve stem air tube 36 and is configured to be externally inserted with force into an opening of a container. This is shown, for example, in FIG. 3, as opening 42 in wheel rim 40. Compression seal 36 is preferably tapered with its distal end at its most narrow and gradually tapering to a larger diameter than opening 42. Due to the pliable nature of the compression seal material, the thicker end of the taper may still be pushed through the rim opening without undue force to reach the rim sealer notch 52. Nevertheless, rubber sleeve 36 can optionally be cylindrical, such as shown in FIGS. 4-7. In the embodiment of FIG. 19 compression sleeve 36h is shown having an annular ring that can extend 0.075"-0.200" above its connection to notch 52. This embodiment allows for a reduction of material to facilitate an easier insertion through opening 42 and to allow for a broader dimension 51 under compression as this annular ring is allowed to spread on the inner surface of wheel rim 40

Thus, the distal end of the rubber seal 36 is approximately the same diameter as the hole 42 so that it initially inserts easily. As it is pushed through hole 42, the compression sleeve material near flange 38 stretches going inside of the wheel rim wall and the cone formed by the rubber sleeve taper deforms enough to make it through the opening. As soon as the detent 52 passes through rim opening 42, the upper tapered portion of compression sleeve 36 expands to extend beyond the entire perimeter of rim opening 42, thus allowing the top portion of the tapered rubber sleeve to expand to a greater diameter than the rim opening 42. A rim sealer collar 54 can provide a positive stop to resist over insertion of the rubber seal. Next, rotation of compression nut 32 withdraws flange 38 from the rim opening, taking the bottom portion of the compression sleeve with it. The pressure of rubber sleeve 38 against the perimeter of the inner side of the wheel rim opening caused by withdrawing flange 38 causes an air/fluid tight seal of the valve stem 20 about the opening. A stop at the bottom of compression threads 30 can be employed to prevent over-tightening of the valve stem against the wheel rim. Also, a second nut can be employed as a locking nut to keep the compression nut 32 from moving once installed. The rubber seal rotation resistance and a locking nut would be guaranteed to keep it snug. The portion that engages the interior wall of the wheel rim may optionally by slightly convex or concave so that the outer perimeter of the compression sleeve is slightly (e.g., 0.2 cm) sloped upward (exteriorly) or downward (interiorly) towards the center of compression sleeve 36.

38 The valve stem air tube flange (approx. 1.320 for 1.588 cm opening). To assist in the insertion of rubber sleeve 36, a valve stem air tube flange at the very distal end of the valve stem air tube 28 is encased inside of the bottom of rubber sleeve 36 and is contiguous with the metal tube.

40 The wheel rim.

42 The wheel rim valve stem receiving hole.

43 The wheel rim receiving opening/hole dimension (e.g., approx. 1.588 cm or 1.15 cm, or 1.588 cm or 1.15 cm).

44 The air shaft for metal air tube.

45 Exemplary wheel rim thickness and notch 52 height (approx. 0.2 cm).

46 Exemplary compression sleeve taper.

47 Compression sleeve taper angle

48 Compression sleeve taper angle/dimension

50 The compression sleeve interior profile.

51 The upper taper diameter of the compression sleeve (approx. 1.97 cm for 1.588 cm opening and 9 degree taper; and approx. 2.29 cm for 1.588 cm opening and 19 degree taper when the narrower end at the distal end of the compression sleeve is approx. 1.575 cm). In another embodiment where the container wall opening is 1.15 cm, the upper taper diameter can be (approx. 1.829 cm for 1.15 cm opening and 13 degree taper; and approx. 1.524 cm for 1.15 cm opening and a 19 degree taper when the narrower end at the distal end of the compression sleeve is approximately 1.143 cm).

The dimension material of the compression sleeve beyond the air tube flange 38 could be no less than approx. 1/16" (e.g., 1/16").

52 The rim sealer notch/detent

53 The rim sealer collar 54 outer diameter (approx. no less than 1/16" (e.g., 1/16") greater than diameter of wheel rim valve stem receiving hole (42)). According to another approach, dimension 53 can be between 1/16" to 1/4".

54 The rim sealer collar (approx. 1.97 cm for 1.588 cm opening).

55 The rim seal collar thickness (approx. 1/16" to 3/32"), which might deform to a 1/64" under pressure. Should be no less than 1/16").

57 The bottom taper diameter (approx. 1.143 cm for 1.15 cm opening to 1.575 cm for 1.588 cm opening)

58 A vulcanized area.

60 Air flow.

61 FIG. 1 dimension: taper angle approx. 77-81 degrees.

62 FIG. 1 dimension: taper delta (approx. 1.524 cm-1.829 cm).

63 FIG. 1 dimension: detent diameter (approx. 1.588 cm for 1.588 cm opening).

The diameter dimension of notch 52. It is noted that the shape and dimensions are dependent on density of compression sleeve material.

64 FIG. 1 dimension: rubber sleeve height.

65 FIG. 1 dimension: (approx. 0.254 cm).

66 FIG. 1 dimension: (approx. 3/32").

67 Thread stop (no threads to stop withdraw of the tube).

Figure 20:
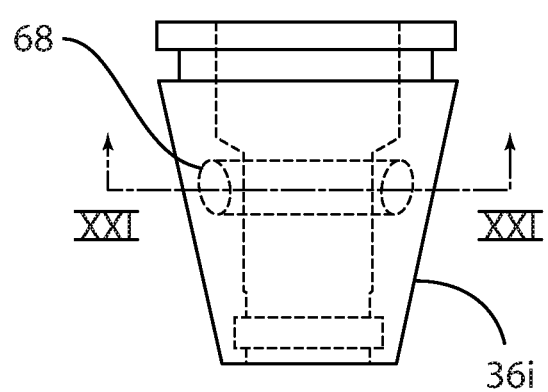
Figure 21:
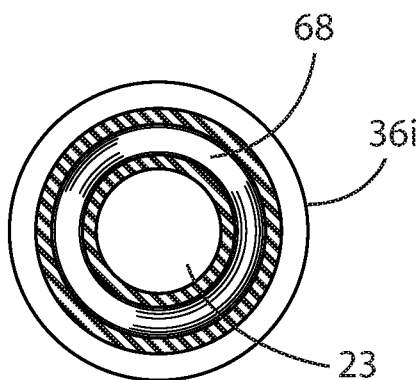
Figure 22:
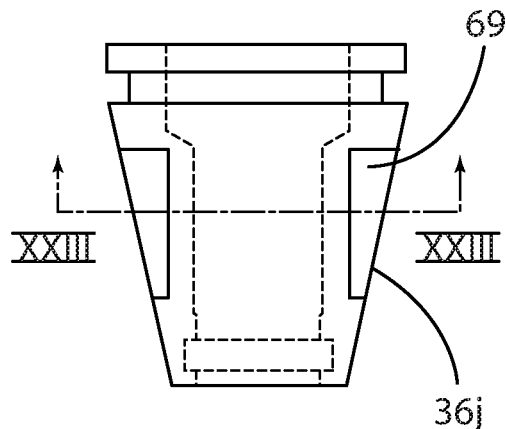
Figure 23:
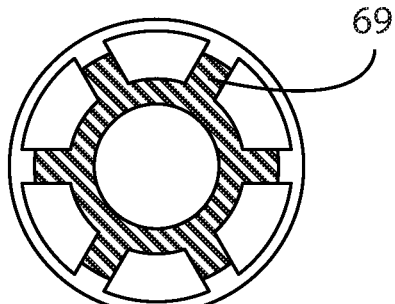
Figure 24:
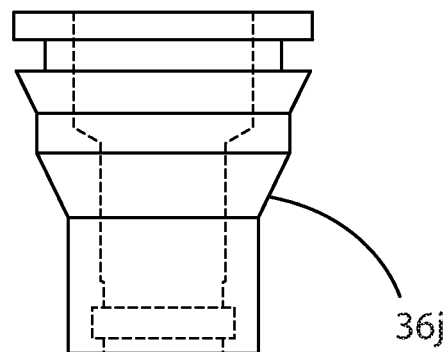
Figure 25:
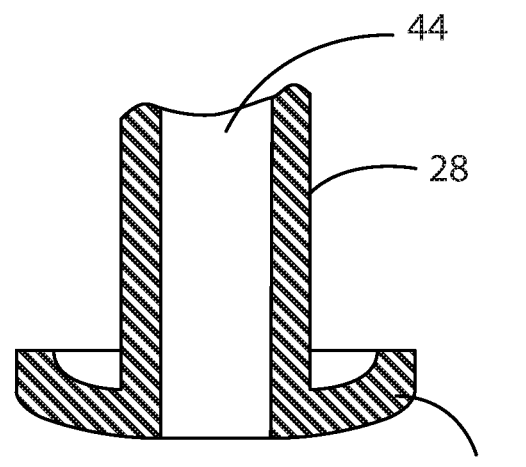
FIGS. 25 and 26 illustrate alternate embodiments of a valve stem air tube flange.

68 Optional donut shaped void in compression sleeve (36) FIGS. 20-21.

69 Flexible fins

70 Exemplary tank (such as an oil tank)

71 Exemplary fluid valve held in place within a tank opening with one of the present embodiment.

FIG. 28 provides a wheel rim having multiple rim openings 42, each having a valve stem according to the present embodiments. This embodiment provides a quick and simple retrofit for any tire and would make fluid filling, or especially draining, much easier for the user since putting fluid in builds pressure and letting fluid out creates a vacuum. The second hole would solve this.

It will be understood that various changes in the details, materials, and arrangements of the valve stems, which have been herein described and illustrated in order to explain the nature of the package and methods, may be made by those skilled in the art within the principle and scope of the embodied packages, laminates and methods as expressed in the appended claims.

I claim:

1. A valve stem assembly, comprising: a deformable and compressible partially wedge-shaped compression sleeve configured to be partially insertable with force through a container wall opening from an exterior side of the container wall through to an interior side the container wall, the compression sleeve having, a first end having a first flange of a first diameter, the first diameter being greater than a diameter of the container wall opening, a second flange adjacent to the first flange having a second diameter equal to the diameter of the container wall opening, a compression sleeve wedge having a top adjacent to the second flange having a third diameter, the third diameter being greater than the container wall opening, the compression sleeve wedge extending to a compression sleeve wedge bottom having a fourth diameter, the fourth diameter being smaller than the container wall opening, and a bore extending from the first end to the second end, a first valve stem portion extending partially through the bore, the valve stem having an interior and an exterior including an exterior valve stem threads; a valve core mounted in the valve stem interior; an exteriorly accessible nut engageable with the exterior stem threads of a second valve stem portion, wherein the compression sleeve is configured to be exteriorly inserted through the container wall opening by application of force sufficient to deform and compress the compression sleeve to allow passage of the second end of the compression sleeve until a bottom edge of the first flange is adjacent to the container exterior side; and wherein movement of the exterior accessible nut on the stem threads clamps the first flange on the exterior of the container wall and moves the compression sleeve wedge to expand and seal against the interior of the container wall.

2. The apparatus of claim 1, further comprising: the exterior accessible nut including a nut body with wing ears.

3. The apparatus of claim 1, the stem threads ending at a stop offset for limiting the pressure applied to the seal.

* * * * *